(12) United States Patent
Breternitz, Jr. et al.

(10) Patent No.: US 11,880,610 B2
(45) Date of Patent: Jan. 23, 2024

(54) STORAGE LOCATION ASSIGNMENT AT A CLUSTER COMPUTE SERVER

(71) Applicant: ADVANCED MICRO DEVICES, INC., Santa Clara, CA (US)

(72) Inventors: Mauricio Breternitz, Jr., Austin, TX (US); Leonardo Piga, Campinas (BR)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/098,872

(22) Filed: Nov. 16, 2020

(65) Prior Publication Data

US 2021/0173591 A1 Jun. 10, 2021

Related U.S. Application Data

(63) Continuation of application No. 14/568,181, filed on Dec. 12, 2014, now Pat. No. 10,866,768.

(51) Int. Cl.
| | |
|---|---|
| *G06F 15/16* | (2006.01) |
| *G06F 3/06* | (2006.01) |
| *H04L 67/1097* | (2022.01) |
| *G06F 8/00* | (2018.01) |
| *G06F 11/00* | (2006.01) |
| *G06F 9/455* | (2018.01) |

(52) U.S. Cl.
CPC ............ *G06F 3/0683* (2013.01); *G06F 3/067* (2013.01); *G06F 3/0607* (2013.01); *G06F 3/0619* (2013.01); *G06F 3/0635* (2013.01); *G06F 8/00* (2013.01); *G06F 11/00* (2013.01); *H04L 67/1097* (2013.01); *G06F 2009/45579* (2013.01)

(58) Field of Classification Search
None
See application file for complete search history.

(56) References Cited

U.S. PATENT DOCUMENTS

| | | | | |
|---|---|---|---|---|
| 6,839,740 | B1 * | 1/2005 | Kiselev | G06F 3/0664 711/148 |
| 7,676,628 | B1 * | 3/2010 | Compton | G06F 3/0665 711/202 |
| 8,180,961 | B1 * | 5/2012 | Jiang | G06F 21/6227 711/163 |
| 8,239,589 | B1 * | 8/2012 | Certain | G06F 3/0673 710/39 |
| 8,479,211 | B1 * | 7/2013 | Marshall | G06F 9/5077 718/104 |
| 8,966,027 | B1 * | 2/2015 | Brandwine | G06F 9/45558 709/200 |
| 9,037,826 | B1 * | 5/2015 | Brooker | G06F 3/0689 711/167 |

(Continued)

FOREIGN PATENT DOCUMENTS

CN 105138435 A * 12/2015 .......... G06F 11/1448

*Primary Examiner* — Phyllis A Book

(57) ABSTRACT

A cluster compute server stores different types of data at different storage volumes in order to reduce data duplication at the storage volumes. The storage volumes are categorized into two classes: common storage volumes and dedicated storage volumes, wherein the common storage volumes store data to be accessed and used by multiple compute nodes (or multiple virtual servers) of the cluster compute server. The dedicated storage volumes, in contrast, store data to be accessed only by a corresponding compute node (or virtual server).

19 Claims, 5 Drawing Sheets

(56) References Cited

U.S. PATENT DOCUMENTS

| | | | | |
|---|---|---|---|---|
| 9,537,745 B1* | 1/2017 | Halcrow | ............... | G06F 3/0664 |
| 9,619,429 B1* | 4/2017 | Wang | ........................ | G06F 9/50 |
| 9,940,377 B1* | 4/2018 | Sait | ........................ | G06F 3/065 |
| 2004/0117562 A1* | 6/2004 | Wu | ..................... | G06F 11/2076 |
| | | | | 709/213 |
| 2010/0036850 A1* | 2/2010 | Garman | ................ | G06F 9/5016 |
| | | | | 707/E17.032 |
| 2010/0036931 A1* | 2/2010 | Certain | ............... | G06F 11/1451 |
| | | | | 711/E12.001 |
| 2011/0040937 A1* | 2/2011 | Augenstein | ........... | G06F 16/185 |
| | | | | 711/E12.001 |
| 2012/0030424 A1* | 2/2012 | Nunez | ..................... | G06F 3/067 |
| | | | | 711/E12.001 |
| 2013/0097380 A1* | 4/2013 | Colgrove | ............. | G06F 3/0608 |
| | | | | 711/E12.017 |
| 2013/0132769 A1* | 5/2013 | Kulkarni | ............. | G06F 11/2094 |
| | | | | 714/6.22 |
| 2014/0281317 A1* | 9/2014 | Garman | ............. | G06F 11/1448 |
| | | | | 711/162 |
| 2014/0289358 A1* | 9/2014 | Lindamood | ............. | G06F 3/065 |
| | | | | 709/214 |
| 2015/0019829 A1* | 1/2015 | Sivasubramanian | ... | G06F 3/061 |
| | | | | 711/162 |
| 2015/0143164 A1* | 5/2015 | Veerla | ................. | G06F 11/2069 |
| | | | | 714/54 |
| 2015/0212760 A1* | 7/2015 | Goel | ..................... | G06F 3/0644 |
| | | | | 711/163 |
| 2017/0024142 A1* | 1/2017 | Watanabe | ............. | G06F 3/0608 |

* cited by examiner

STORAGE LOCATION ASSIGNMENT AT A CLUSTER COMPUTE SERVER

CROSS-REFERENCE TO RELATED APPLICATIONS

The present application is a continuation application of U.S. patent application Ser. No. 14/568,181, entitled "STORAGE LOCATION ASSIGNMENT AT A CLUSTER COMPUTE SERVER", and filed on Dec. 12, 2014, the entirety of which is incorporated by reference herein.

BACKGROUND

Field of the Disclosure

The present disclosure relates generally to processing systems and more particularly to data storage at a cluster compute server.

Description of the Related Art

High performance computing systems, such as server systems, are sometimes implemented using compute nodes connected together by one or more fabric interconnects. The compute nodes execute software programs to perform designated services, such as file management, database management, document printing management, web page storage and presentation, computer game services, and the like, or a combination thereof. The multiple compute nodes facilitate the processing of relatively large amounts of data while also facilitating straightforward build-up and scaling of the computing system. The fabric interconnects provide a backbone for communication between the compute nodes.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
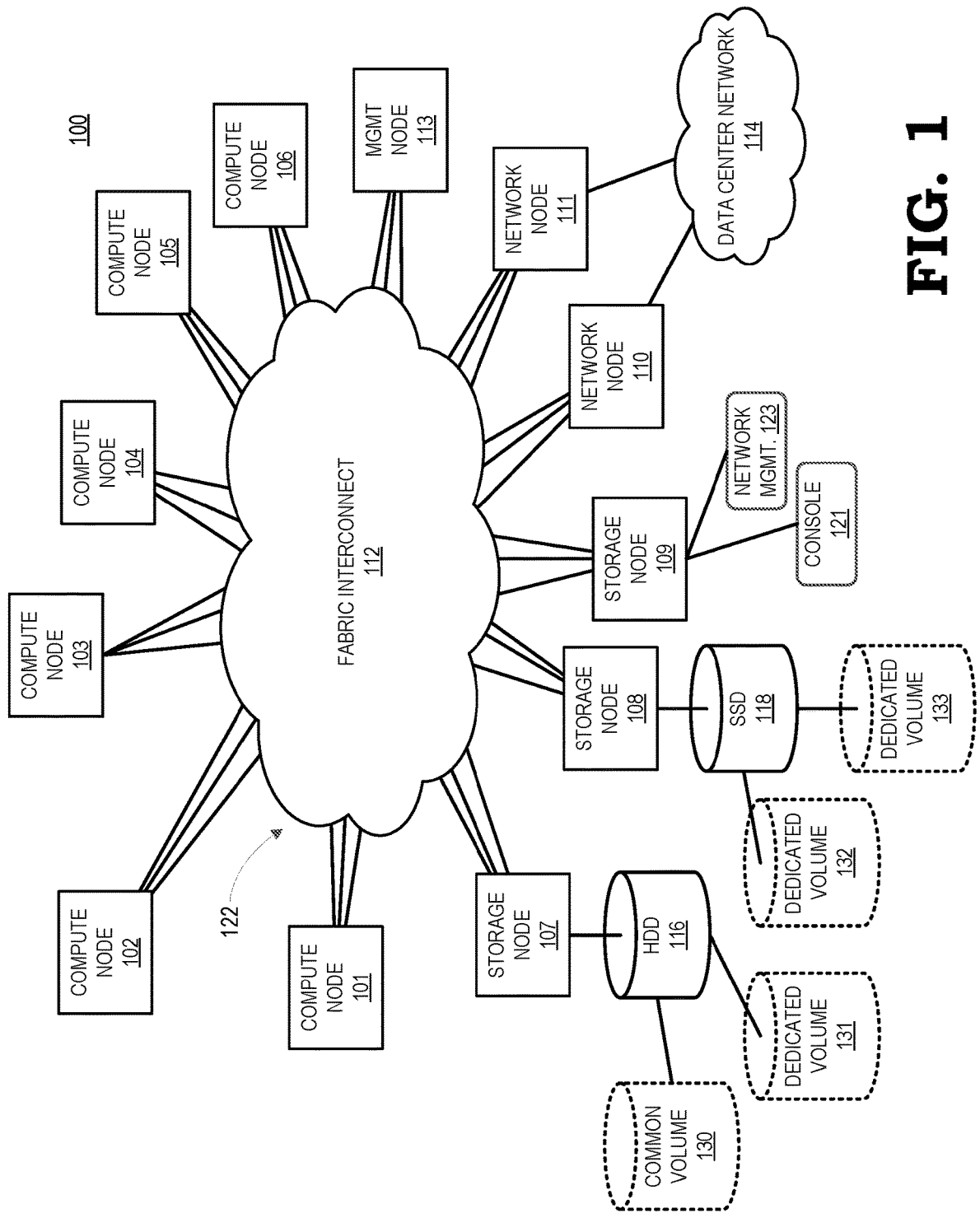
FIG. 1 is a block diagram of a cluster compute server in accordance with some embodiments.

FIGS. 1-6 illustrate techniques for storing different types of data at different storage volumes of a cluster compute server in order to reduce data duplication at the storage volumes. The storage volumes are categorized into at least two classes, including: common storage volumes and dedicated storage volumes, wherein the common storage volumes store data to be accessed and used by multiple compute nodes (or multiple virtual servers) of the cluster compute server. The dedicated storage volumes, in contrast, store data to be accessed only by a corresponding compute node (or corresponding virtual server). In some embodiments, the common storage volumes store data that is to be used, but is identified as unlikely to be modified, by many different compute nodes, thereby reducing data duplication.

To illustrate via an example, in some scenarios different compute nodes of the cluster compute server may execute the same operating system. Conventionally, each compute node would store a separate copy of the operating system at its own dedicated storage volume of the cluster compute server. However, most portions of the operating system are "read-only" portions that are not modifiable by a compute node in normal operation. Accordingly, keeping separate copies of the operating system at different storage volumes is unnecessarily duplicative, and requires each storage volume to be relatively large to accommodate the operating system. Under the techniques described herein, a single copy of the operating system can be stored at the common storage volumes, and each compute node can retrieve the operating system for execution from the common storage volumes. Thus, a separate copy of the operating system is not stored at each dedicated storage volume, reducing unnecessary duplication of data and allowing the cluster compute server to operate with smaller storage devices or to make more efficient use of existing storage devices.

In some embodiments, a compute node may attempt to write to a storage location of the common storage volume. For example, a storage node may seek to modify a configuration option for the operating system by writing a value for the option to an associated location of the common storage volume. To prevent such a write from undesirably altering behavior of the operating system for all compute nodes of the server, a storage controller at each compute node monitors read and write requests to locations of the common storage volume. In response to a write request, the storage controller stores an address of the location in a table of modified locations, and writes the data of the write request to a location in the dedicated storage volume of the corresponding compute node. In response to a read request, the storage controller identifies whether the address targeted by the location is stored in the table of modified locations. If so, the storage controller redirects the read request to the corresponding location of the dedicated storage volume. The storage controllers of the compute nodes thereby provide for individual modification, by each compute node, of configuration data and other data at the common storage volume.

FIG. 1 illustrates a cluster compute server 100 in accordance with some embodiments. The cluster compute server 100, referred to herein as "server 100", comprises a data center platform that brings together, in a rack unit (RU) system, computation, storage, switching, and server management. The server 100 is based on a parallel array of independent low power compute nodes (e.g., compute nodes 101-106), storage nodes (e.g., storage nodes 107-109), network nodes (e.g., network nodes 110 and 111), and management nodes (e.g., management node 113) linked together by a fabric interconnect 112, which comprises a high-bandwidth, low-latency supercomputer interconnect. Each node is implemented as a separate field replaceable unit (FRU) comprising components disposed at a printed circuit board (PCB)-based card or blade so as to facilitate efficient build-up, scaling, maintenance, repair, and hot swap capabilities.

The compute nodes operate to execute various software programs, including operating systems (OSs), hypervisors, virtualization software, compute applications, and the like. As with conventional server nodes, the compute nodes of the server 100 include one or more processors and system memory to store instructions and data for use by the one or more processors. However, unlike conventional server nodes, in some embodiments the compute nodes do not individually incorporate various local peripherals, such as storage, I/O control, and network interface cards (NICs). Rather, remote peripheral resources of the server 100 are shared among the compute nodes, thereby allowing many of the components typically found on a server motherboard, such as I/O controllers and NICs, to be eliminated from the compute nodes and leaving primarily the one or more processors and the system memory, in addition to a fabric interface device.

In some embodiments, the compute nodes 101-106 execute one or more "virtual servers" wherein a virtual server appears to one or more users or devices external to the server 100 as a unique hardware server that executes services for the user. Thus, for example, the compute node 101 may execute software and interact with the resources of the server 100 such that it executes a virtual server that appears to one or more external devices (such as one or more servers, end-user devices, and the like, connected to the server 100 via a network) as a unique server device. Simultaneously, the compute node 102 may concurrently execute software and interact with the resources of the server 100 such that it executes a virtual server that appears to one or more external devices (including the one or more servers, end-user devices, and the like, that interact with the virtual server of the compute node 101) as a unique server device, different from the unique server device presented by the virtual server executing at the compute node 101. For ease of description, it will be assumed that in the examples of FIGS. 1-6, the compute nodes of the server 100 each execute a different virtual server. However, it will be appreciated that in some embodiments a virtual server can be executed by multiple compute nodes working together.

After configuration in response to a system reset, the fabric interface device, which may be implemented as, for example, an application-specific integrated circuit (ASIC), operates to virtualize the remote shared peripheral resources of the server 100 such that these remote peripheral resources appear to the OS executing at each processor to be located on corresponding processor's local peripheral bus. These virtualized peripheral resources can include, but are not limited to, mass storage devices, consoles, Ethernet NICs, Fiber Channel NICs, Infiniband™ NICs, storage host bus adapters (HBAs), Universal Serial Bus (USB) devices, Firewire™ devices, PCIe devices, user interface devices (e.g., video, keyboard, and mouse), and the like. This virtualization and sharing of remote peripheral resources in hardware renders the virtualization of the remote peripheral resources transparent to the OS and other local software at the compute nodes. Moreover, this virtualization and sharing of remote peripheral resources via the fabric interface device permits use of the fabric interface device in place of a number of components typically found on the server motherboard. This reduces the number of components implemented at each compute node, which in turn enables the compute nodes to have a smaller form factor while consuming less energy than conventional server blades which implement separate and individual peripheral resources.

Although the FRUs implementing the nodes typically are physically arranged in one or more rows in a server box, the fabric 122 can, during bootstrap or other configuration, logically arrange the nodes in any of a variety of mesh topologies or other network topologies, such as a torus, a multi-dimensional torus (also referred to as a k-ary n-cube), a tree, a fat tree, and the like. For purposes of illustration, the server 100 is described herein in the context of a multi-dimensional torus network topology. However, the described techniques may be similarly applied in other network topologies using the guidelines provided herein.

The fabric interface device of the compute nodes, the fabric interfaces of the I/O nodes, and the fabric interconnect 112 together operate as a fabric 122 connecting the computing resources of the compute nodes with the peripheral resources of the I/O nodes. To this end, the fabric 122 implements a distributed switching facility whereby each of the fabric interfaces and fabric interface devices comprises multiple ports connected to bidirectional links of the fabric interconnect 112 and, after configuration of the fabric interconnect 112 in response to a system reset, operate as link layer switches to route packet traffic among the ports in accordance with deterministic routing logic implemented at the nodes of the server 100. Note that the term "link layer" generally refers to the data link layer, or layer 2, of the Open System Interconnection (OSI) model.

The fabric interconnect 112 can include a fixed or flexible interconnect such as a backplane, a printed wiring board, a motherboard, cabling or other flexible wiring, or a combination thereof. Moreover, the fabric interconnect 112 can include electrical signaling, photonic signaling, or a combination thereof. In some embodiments, the links of the fabric interconnect 112 comprise high-speed bi-directional serial links implemented in accordance with one or more of a Peripheral Component Interconnect-Express (PCIE) standard, a Rapid IO standard, a Rocket IO standard, a HyperTransport standard, a FiberChannel standard, an Ethernet-based standard, such as a Gigabit Ethernet (GbE) Attachment Unit Interface (XAUI) standard, and the like.

The storage nodes and the network nodes (collectively referred to as "input/output (I/O) nodes") implement a peripheral device controller that manages one or more shared peripheral resources. This controller coordinates with the fabric interface devices of the compute nodes to virtualize and share the peripheral resources managed by the resource manager. As an example of the shared peripheral resources managed by the I/O nodes, the storage node 109 manages a console/universal asynchronous receiver-transmitter (UART) 121, and a data center management network 123. The network nodes 110 and 111 each manage one or more Ethernet uplinks connected to a data center network 114. The Ethernet uplinks are analogous to the uplink ports of a top-of rack switch and can be configured to connect directly to, for example, an end-of-row switch or core switch of the data center network 114.

The storage node 107 manages a hard disc drive (HDD) 116 and the storage node 108 manages a solid state drive (SSD) 118. In some embodiments, mass storage devices may be logically separated into slices, or storage volumes. As used herein, a storage volume refers to an accessible storage area within a file system of the server 100. Further, a storage volume refers to an accessible storage area of one or more non-volatile storage devices of the server 100, and does not refer to caches or volatile memory (e.g. RAM) located at the compute nodes 101-106. A storage volume is a logical entity that can include portions of different storage devices. For example, in some embodiments a storage volume can include a portion located (stored) on a given HDD, and a different portion located on a different HDD, each of which may be allocated to a single compute node, or, if used in a read-only mode, shared by multiple compute nodes as a large shared data cache. The sharing of a virtual disk enables users to store or update common data, such as operating systems, application software, and cached data, once for the entire server 100.

The storage volumes of the server 100 can be either of two different types: a common storage volume or a dedicated storage volume. As used herein, a common storage volume refers to a volume that stores data common to more than one virtual server being executed at the server 100. That is, the data at a common storage volume can be usefully accessed by more than one virtual server (and corresponding compute node) of the server 100. A dedicated storage volume refers to a storage volume that is dedicated to a corresponding virtual server. The data at a dedicated storage volume cannot be usefully accessed by virtual servers other than its corresponding virtual server.

In some embodiments, a dedicated storage volume is isolated from other virtual servers by the ASICs at each compute node that virtualize the resources of the server 100 as described above. To emulate the storage devices of the server 100 so that a compute node appears, to software executing at the node, to have local storage devices, the corresponding ASIC maintains a mapping of an address space for virtualized storage devices of the compute node (referred to as the "local address space") to an address space for storage locations of the storage devices 116 and 118 (referred to as "server address space"). In response to receiving from the compute node a memory access request to access a memory location of a virtualized storage device, the ASIC translates the memory address of the memory access request to the server address space, and provides the translated memory access request to the appropriate one of the storage devices 116 and 118 for satisfaction. To dedicate a storage volume to a virtual server, an ASIC can reserve memory addresses in the server address space for the dedicated storage volume. To reserve the memory addresses, the ASIC sends messages, via the fabric interconnect 112, to the ASICs at the other compute nodes requesting reservation. In response to receiving a reservation request, each ASIC ensures that its mapping of local address space to server address space does not map any local addresses to the reserved addresses. Thus, the ASICs of the compute nodes of the server 100 negotiate with each other to ensure that the locations of a dedicated storage volume are mapped to a virtual address space only by the ASIC of the compute node executing the virtual server to which the volume is dedicated. In some embodiments, the dedicated storage volumes are further isolated from unauthorized access by encrypting the dedicated storage volumes using different encryption keys for different virtual servers.

In contrast to dedicated storage volumes, a common storage volume can be accessed by more than one virtual server. To allow access to a common storage volume by multiple compute nodes, the ASICs arrange their memory mappings so that the local memory space for different virtual servers maps to the storage locations of the common storage volume. In some embodiments, the negotiation of the memory mappings at the ASICs, for both common and dedicated storage volumes, takes place during a bootstrap sequence of the server 100. In other embodiments, storage volumes can be dynamically assigned, and the memory mappings renegotiated during execution of virtual servers at the compute nodes of the server 100.

In the illustrated example of FIG. 1, the storage devices of the server 100 have been logically arranged to include a common storage volume 130 and dedicated storage volumes 131, 132, and 133. For ease of description, FIGS. 1-6 are described under the assumption that the common storage volume is common at least to a virtual server executing at compute node 101 and a virtual server executing at compute node 102. In addition, dedicated storage volume 131 is dedicated to the virtual server executing at compute node 101 and dedicated storage volume 131 is dedicated to the virtual server executing at compute node 101.

In some embodiments, the common storage volume 130 stores types of data that are useful to both of the different virtual servers and is, at least in large part, unlikely or unable to be modified by the different virtual servers. For example, the common storage volume 130 can include operating system data (e.g., operating system instructions, configuration variables, and the like) for execution of the same operating system at the different virtual servers. Other examples of data that can be stored at the common storage volume 130 include application program data (e.g., instructions to execute one or more application programs at a virtual server), system configuration information that cannot be modified by a virtual server, and the like. In contrast, the dedicated storage volumes 131 and 132 store data that is useful or likely to be modified differently by the corresponding virtual server to which the volume is dedicated. Examples of data stored at the dedicated storage volumes 131 and 132 can include data files (e.g., user files) unique to the corresponding virtual server.

In some scenarios, it can be useful to allow a virtual server to modify data that is stored at the common storage volume 130. For example, the common storage volume 130 can store an operating system having configuration variables (e.g., fonts, windows behavior, and the like) that can be adjusted by a virtual server. Accordingly, the server 100 allows for some data at the common storage volume 130 to be transferred to a dedicated storage volume in response to a virtual server modifying the data. This can be better understood with reference to FIG. 2, which illustrates a block diagram illustrating operation of the cluster compute server of FIG. 1 in accordance with some embodiments.

Figure 2:
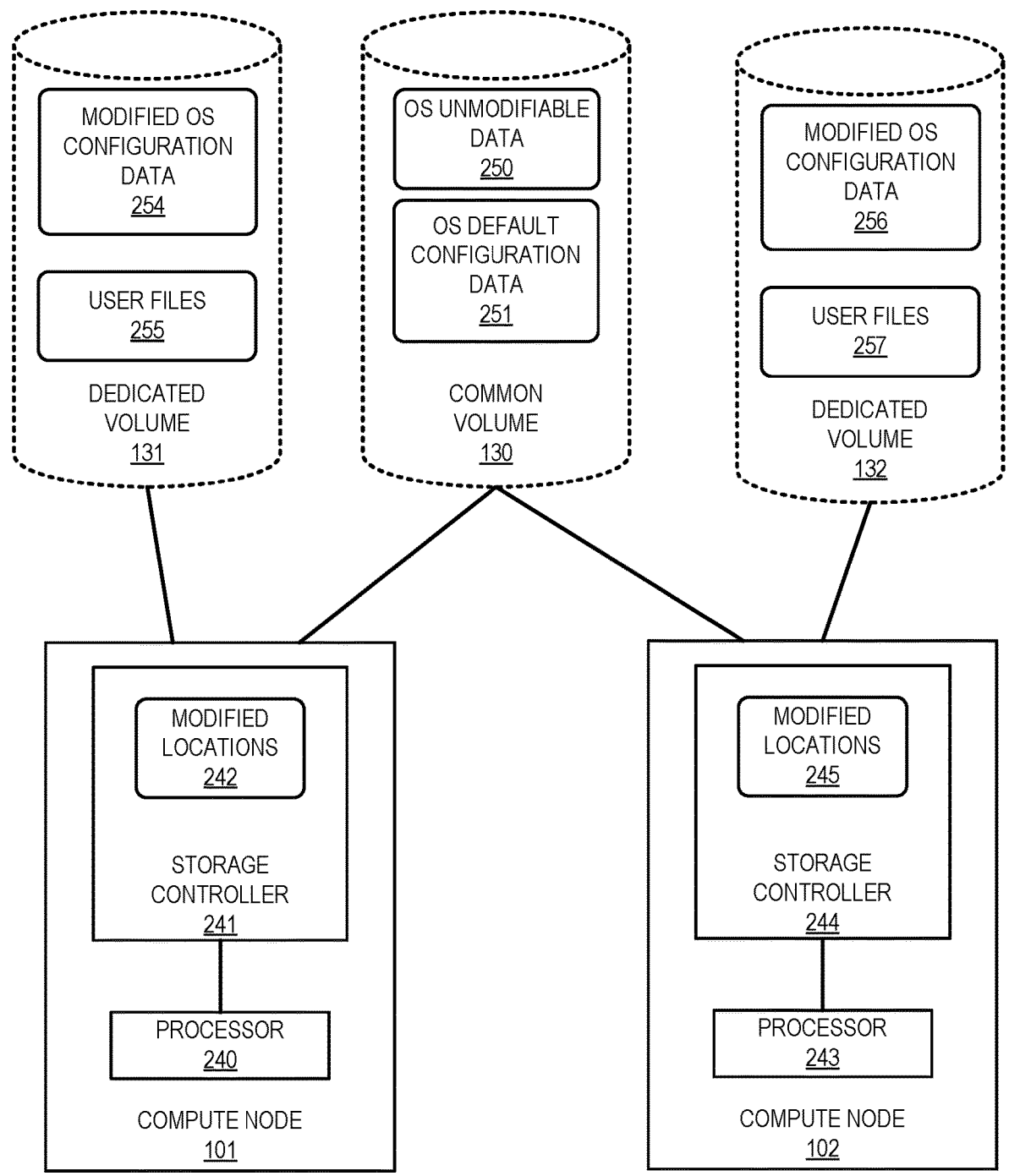
FIG. 2 is a block diagram illustrating operation of the cluster compute server of FIG. 1 to store and retrieve different types of data at a common storage volume and dedicated storage volumes, respectively, in accordance with some embodiments.

FIG. 2 depicts compute nodes 101 and 102, common storage volume 130, and dedicated storage volumes 131 and 132. In the depicted example, common storage volume 130 stores operating system (OS) data having two portions: OS unmodifiable data 250 and OS default configuration data 251. The OS unmodifiable data 250 is data that is not permitted to be modified by virtual servers executing at compute nodes 101 and 102 such as, for example, instructions that perform memory management, thread switching, device management, and other core OS functions. The OS default configuration data 251 stores default values for configuration variables of the OS that can be individually modified by virtual servers executing at compute nodes 101 and 102. For example, the OS default configuration data 251 can include default values for configuration variables indicating the font used by the OS when depicting text in system messages, and other modifiable data.

The dedicated storage volume 131 as depicted stores modified OS configuration data 254 and user files 255. The OS configuration data 254 stores modified values for configuration variables of the OS. That is, the OS configuration data 254 stores configuration data that has been modified, by the virtual server executing at the compute node 101, from the default values reflected in the OS default configuration data 251 stored at the common storage volume 130. The user files 255 store data associated with users of the virtual server executing at the compute node 101, such as data files generated or modified by applications executed at the virtual server by the users.

The dedicated storage volume 132 stores modified OS configuration data 256 and user files 257, which are analogous to the corresponding data stored at the dedicated storage volume 131, as modified or generated by the virtual server executing at the compute node 102. Thus, the OS configuration data 254 stores modified configuration data that has been modified, by the virtual server executing at the compute node 102, from the default values reflected in the OS default configuration data 251 stored at the common storage volume 130. These modified values, and which particular values are stored, can be different from the modified values stored at the OS configuration data 254. The user files 255 store data associated with users of the virtual server executing at the compute node 102.

The compute nodes 101 and 102 respectively include processor 240 and 243, which execute the virtual server at each respective node. In addition, the compute nodes 101 and 102 include storage controllers 241 and 244 respectively, each configured to provide an interface between their respective processor and the volumes 130-132. In some embodiments, the storage controllers 241 and 244 are portions of the ASIC, as described above with respect to FIG. 1, at the corresponding compute node and perform at least some of the functions described above, including emulation of local storage devices for the processors 240 and 243. For example, the storage controllers 241 and 244 can perform mappings between the local address space of the corresponding virtual server and the server address space of the server 100.

The storage controllers 241 and 244 also manage individual modification of the OS configuration data 251 by their corresponding virtual servers. To facilitate such modification, the storage controllers 241 and 244 include modified locations 242 and 245, respectively. The modified locations 242 reflect the locations of the common storage volume 130 that have been modified (written to) by the virtual server executing at the compute node 101. Similarly, the modified locations 245 reflect the locations of the common storage volume 130 that have been modified (written to) by the virtual server executing at the compute node 102.

In some embodiments the modified locations 242 are stored in a data structure that includes a number of entries, with each entry having a common storage volume address field, indicating the storage location of the common storage volume 130 corresponding to the entry. Each entry also includes a dedicated storage volume address field, indicating the storage location of the dedicated storage volume 132 that stores the modified data corresponding to the entry. In some embodiments, the common storage volume address fields are stored in a Bloom filter.

In operation, in response to receiving from the processor 240 a read request targeted to a location of the common storage volume 130, the storage controller 241 determines if the address targeted by the read request is stored at the modified locations 242. If not, the storage controller 241 fulfills the read request at the location of the common storage volume 130 indicated by the request. If the read address is stored at the modified locations 242, the storage controller redirects the read request and fulfills the request at the location of the dedicated storage volume 131 indicated at the modified locations 242.

In response to receiving from the processor 240 a write request targeted to a location of the common storage volume 130, the storage controller 241 determines if the address targeted by the read request is stored at the modified locations 242. If not, the storage controller 241 identifies a location of the dedicated storage volume 131 to store the write data. The storage controller 241 then stores the address of the location, along with the address of the location of the common storage volume 130, at the modified locations 242. If the write address is stored at the modified locations 242, the storage controller stores the write data the read request and fulfills the request at the location of the dedicated storage volume 131 indicated at the modified locations 242.

Figure 3:
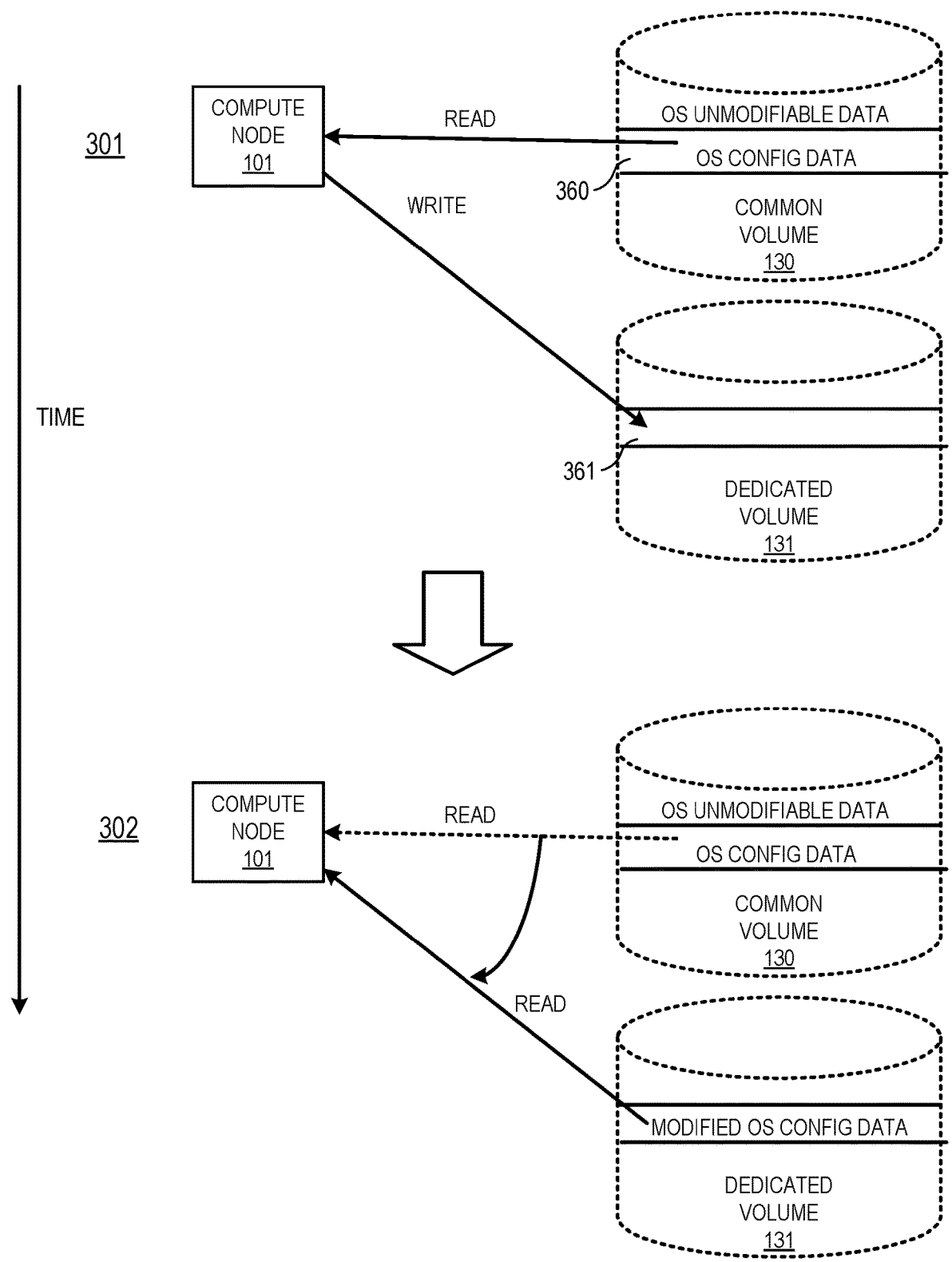
FIG. 3 is a diagram illustrating the retrieval of default configuration data from the common storage volume and writing of modified configuration data at a dedicated storage volume of FIG. 2 in accordance with some embodiments.

FIG. 3 illustrates an example of transferring data from the common storage volume 130 to a dedicated storage volume in accordance with some embodiments. In the depicted example, at a time 301, a virtual server executing at the compute node 101 at a storage location 360 of the common storage volume 130. The storage controller 241 determines that the address of storage location 360 is not stored at the modified locations 242. Accordingly, the storage controller 241 performs a read at the targeted storage location 360.

In addition, the virtual server modifies the read data and attempts to write it back to the storage location 360 by issuing a write access. The storage controller 241 identifies the write access as targeted to a location of the common storage volume 130. In response, the storage controller 241 identifies location 361 of dedicated storage volume 131 as corresponding to storage location 360. In some embodiments, the addresses of locations of dedicated storage volume 131 are related to the storage locations of common storage volume 130 by a predefined hash, and the storage controller 241 identifies the address of storage location 361 by performing the hash on the address of storage location 360. The storage controller 241 redirects the received write access by writing the data to the storage location 361, rather than to storage location 360. In addition, the storage controller 241 stores the address for storage location 360 at the modified locations 242.

Subsequently, at time 302, the virtual server executing at compute node 101 generates a read access targeted to storage location 360. The storage controller 241 compares the read address (i.e., the address of storage location 360) to the addresses stored at the modified locations 242. In response to determining that the read address is stored at the modified locations 242, the storage controller 241 performs the predefined hash on the read address to identify storage location 361. The storage controller 241 then redirects the read access by reading data from storage location 361 and providing the read data to the virtual server in response to the read access. Thus, the virtual server executing at compute node 101 is unaware that the modified data is read from a different location at time 302 than the unmodified data at time 301. This allows the server 100 to store common data at the common storage volume 130, reducing data duplication across the server, while still allowing the virtual servers to modify at least some portions of the common data.

It will be appreciated that a virtual server executing at compute node 102 can independently access and, if necessary, modify the data stored at location 360. For example, at a time subsequent to time 302 (not illustrated at FIG. 3), a virtual server executing at compute node 102 can issue a read request for storage location 360. The storage controller 244 executes the read request in similar fashion as described above with respect to storage controller 241 at time 301. In particular, because the address for storage location 360 is not stored in the modified locations 245, the storage controller 244 reads the data from storage location 360. Thus, because the modified data for the virtual server executing at compute node 101 has been transferred to storage location 361 of its dedicated storage volume 131, the modification has no impact on the data to be read by storage controller 244. This allows the server 100 to store common data at the common storage volume 130 for multiple executing virtual servers, while allowing those servers to independently and differently modify at least portions of the common data.

If the virtual server executing at compute node 102 modifies the data read from storage location 360, the storage controller 244 performs a write operation. This write operation is similar to that described above with respect to time 301, but the storage controller 244 stores the write data at a storage location of dedicated storage volume 132 and stores the address of storage location 360 at its own modified locations 245 data structure. In response to receiving a subsequent read access to storage location 360, the storage controller 244 redirects the read access to read data from the storage location of dedicated storage volume 132, in similar fashion to that described above with respect to time 302.

As indicated above, in some embodiments the modified locations 242 and 245 can each be stored in data structures, such as Bloom filters, that conserve space by having entries of the data structures share selected individual bits. A Bloom filter or similar data structure ensures that the modified locations 242 will not return a false negative; that is, the storage controller 241 will not incorrectly determine that the modified locations 242 does not store an address that it does, in fact, store. However, the Bloom filter or similar data structure can return a false positive; that is, in some cases the storage controller 241 can determine that the modified locations 242 stores an address that it does not in fact store. In such cases, the storage controller may incorrectly redirect a read access targeted to the common storage volume 130 to a location of the dedicated storage volume 131. To prevent such an incorrect redirect from impacting behavior of the executing virtual server, during bootstrap or other initialization of the dedicated storage volume 131, the volume's storage locations can be populated with pre-defined error codes. In response to redirecting a read access, the storage controller 241 can compare the read data to the pre-defined error code for the storage location. If there is a match, the storage controller 241 determines that the read access has been incorrectly redirected. In response, the storage controller 241 executes the read at the targeted location of the common storage volume 130.

Figure 4:
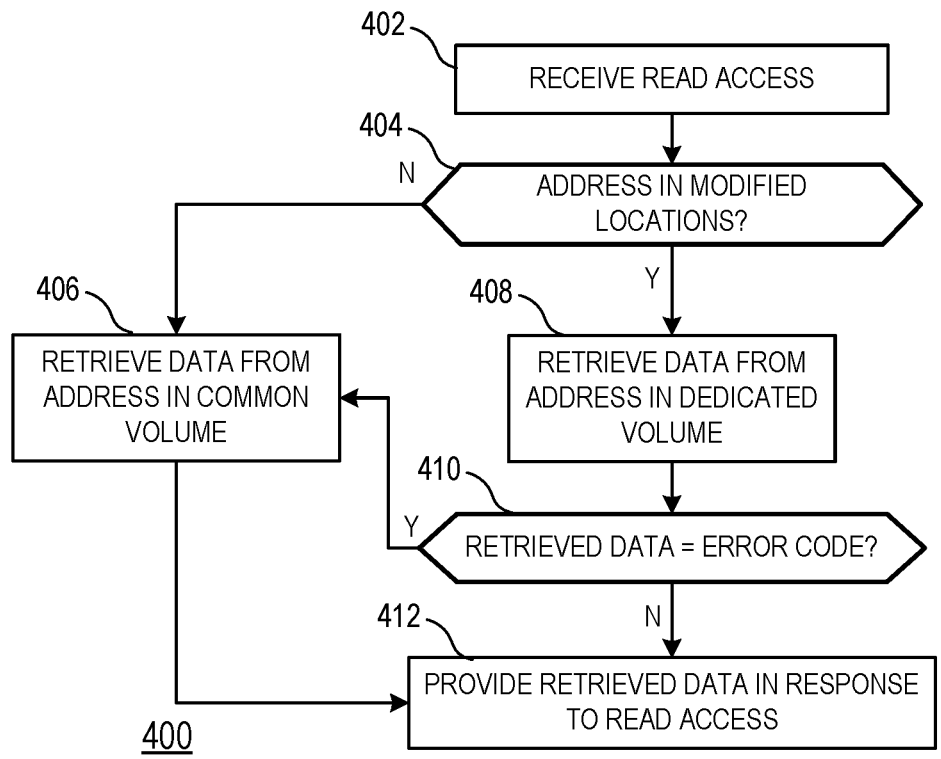
FIG. 4 is a flow diagram of a method of reading data from storage volumes of the cluster compute server of FIG. 1 in accordance with some embodiments.

FIG. 4 illustrates a flow diagram of a method 400 of processing a read access at the storage controller 241 in accordance with some embodiments. At block 402, the storage controller 241 receives a read access from the virtual server executing at processor 240. For purposes of description, it is assumed that the read access is targeted at a location of common storage volume 130. At block 404, the storage controller 241 determines if the read address of the read access is stored at the modified locations 242. If not, the method flow moves to block 406 and the storage controller 241 retrieves read data from the location of the common storage volume 130 corresponding to the read address. The method flow moves to block 412 and the storage controller 241 provides the read data to the virtual server in response to the read access.

Returning to block 404, if the storage controller 241 determines that the read address is stored at the modified locations 242, it identifies the address of the corresponding storage location for the dedicated storage volume 131. In some embodiments, it identifies the address based on an entry of the modified locations 242. In some embodiments, it identifies the address by performing a hash or other calculation based on the read address. At block 408, the storage controller 241 performs the read at the storage location of the dedicated storage volume 131 indicated by the identified address. The method flow proceeds to block 410, and the storage controller 241 compares the read data to a predefined error code. If there is a match, this indicates that the read access was incorrectly redirected to the dedicated storage volume 131. Accordingly, the method flow moves to block 406 and the storage controller 241 performs the read at the storage location of the common storage volume 130 indicated by the read address. Returning to block 410, if the read data does not match the error code, the method flow moves to block 412 and the storage controller 241 provides the read data (as read from the dedicated storage volume 131) to the virtual server in response to the read access.

Figure 5:
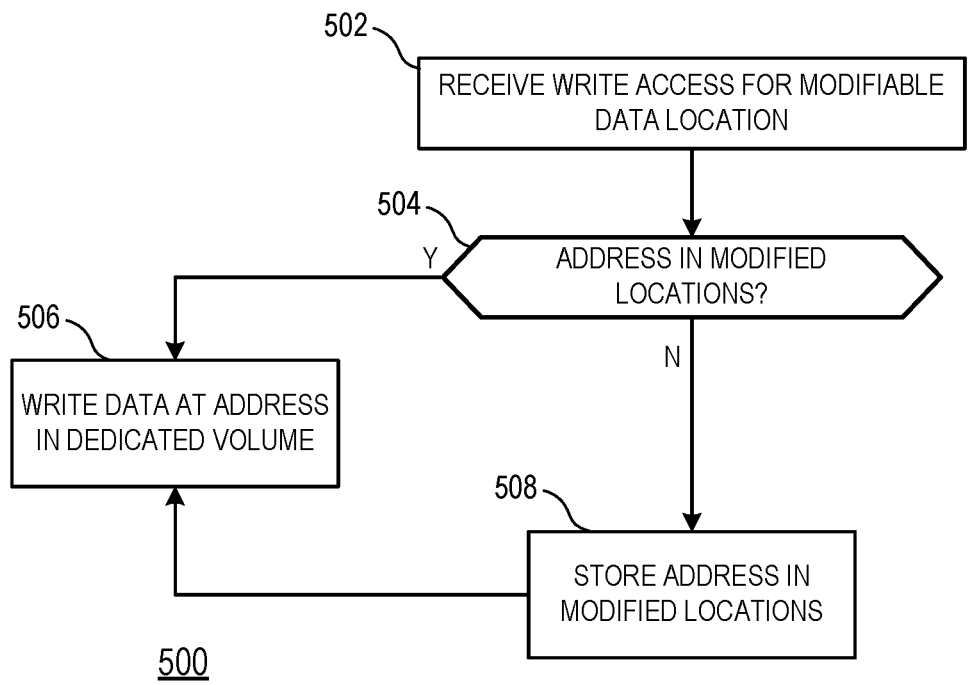
FIG. 5 is a flow diagram of a method of writing data at storage volumes of the cluster compute server of FIG. 1 in accordance with some embodiments.

FIG. 5 illustrates a flow diagram of a method 500 of processing a write access at the storage controller 241 in accordance with some embodiments. At block 502 the storage controller 241 receives a write access from the virtual server executing at processor 240. At block 504 the storage controller 241 determines whether the write address is stored at the modified locations 242. If so, the method flow moves to block 506 and the storage controller 241 identifies a location of the dedicated storage volume 131 corresponding to the write address. The storage controller 241 then writes the write data at the identified location.

Returning to block 504, if the storage controller 241 determines that the write address is not stored at the modified locations 242, the method flow moves to block 508 and the storage controller 241 stores the write address at the modified locations 242. The method flow moves to block 506 and the storage controller 241 identifies a location of the dedicated storage volume 131 corresponding to the write address. The storage controller 241 then writes the write data at the identified location.

In some embodiments, the apparatus and techniques described above are implemented in a system comprising one or more integrated circuit (IC) devices (also referred to as integrated circuit packages or microchips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 6:
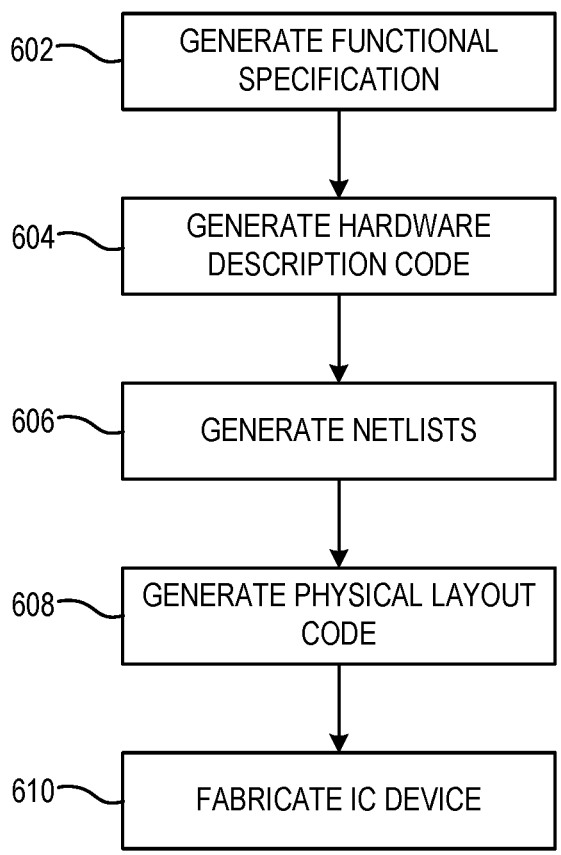
FIG. 6 is a flow diagram illustrating a method for designing and fabricating an integrated circuit device implementing at least a portion of a component of a processing system in accordance with some embodiments.

FIG. 6 is a flow diagram illustrating an example method 600 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB.

At block 604, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 606 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A server system, comprising:
   a common storage volume accessible by a plurality of compute nodes comprising a first compute node;
   a dedicated storage volume dedicated to the first compute node; and
   a storage controller associated with the first compute node, the storage controller to receive a memory access request comprising a first write request targeted to a first location of the common storage volume, and in response to receiving the memory access request, write data of the first write request to the dedicated storage volume and not to the common storage volume.

2. The server system of claim 1, wherein:
   in response to receiving a second memory access request comprising a first read request from the first compute node targeted to the first location of the common storage volume after the first write request, the dedicated storage volume provides data from a second location of the dedicated storage volume to the first compute node.

3. The server system of claim 2, wherein the storage controller is to:
   write an address associated with the first location to a data structure in response to the first write request; and
   provide the second memory access request comprising the first read request to the dedicated storage volume in response to identifying the address associated with the first location stored at the data structure.

4. The server system of claim 3, wherein the data structure comprises a bloom filter.

5. The server system of claim 2, wherein:
   in response to a third memory access request comprising a second read request from a second compute node targeted to the first location of the common storage volume, the common storage volume provides data at the first location to the second compute node.

6. The server system of claim 5, further comprising:
   a second dedicated storage volume coupled to a fabric interconnect; and
   wherein in response to a second write request from the second compute node targeted to the first location, the storage controller writes data to a third storage location of the second dedicated storage volume.

7. The server system of claim 6, wherein:
   in response to a third read request from the second compute node targeted to the first location, the second dedicated storage volume provides data from the third storage location to the second compute node.

8. The server system of claim 6, wherein the storage controller is to:
   encrypt data of the first write request according to a first encryption for storage at the second location.

9. The server system of claim 8, further comprising:
   a second storage controller to encrypt data of the second write request according to a second encryption for storage at a third storage location, the second encryption different than the first encryption.

10. The server system of claim 1, further comprising:
    a second dedicated storage volume coupled to a fabric interconnect; and
    wherein in response to the first write request the second dedicated storage volume writes data to a third location of the second dedicated storage volume.

11. A server system, comprising:
    a common storage volume accessible by a plurality of compute nodes;
    a plurality of dedicated storage volumes dedicated to each of the plurality of compute nodes; and
    each of the plurality of compute nodes to:
    retrieve a first type of data from the common storage volume; and
    store modifications of the first type of data at corresponding different ones of the plurality of dedicated storage volumes in response to identifying a request to modify the first type of data, wherein the first type of data at the common storage volume is not modified.

12. The server system of claim 11, wherein:
    each of the plurality of compute nodes is to retrieve and store a second type of data at its corresponding different one of the plurality of dedicated storage volumes.

13. The server system of claim 12, wherein:
    the second type of data comprises application data generated during execution of an application at a corresponding compute node of the plurality of compute nodes.

14. A method comprising:
    receiving, at a storage controller associated with a first compute node of a server, a memory access request comprising a first write request targeted to a first location of a common storage volume accessible by a plurality of compute nodes comprising the first compute node; and
    providing the memory access request to a dedicated storage volume dedicated to the first compute node and writing data of the memory access request to a second location of the dedicated storage volume and not to the common storage volume.

15. The method of claim 14, further comprising:
    in response to a second read request from the first compute node targeted to the first location after the first write request, providing data from a second location of the dedicated storage volume to the first compute node.

16. The method of claim 15, further comprising:
    writing an address associated with the first location to a data structure in response to the first write request; and
    providing the second read request to the dedicated storage volume in response to identifying the address associated with the first location stored at the data structure.

17. The method of claim 16, wherein the data structure comprises a bloom filter.

18. The method of claim 15, further comprising:
    in response to a third read request from a second compute node targeted to the first location of the common storage volume, providing data at the first location to the second compute node.

19. The method of claim 18, further comprising:
    in response to a second write request from the second compute node targeted to the first location, writing data to a third storage location of a second dedicated storage volume.

* * * * *